United States Patent [19]

Mongault

[11] 4,055,210
[45] Oct. 25, 1977

[54] ANTI-SKID DEVICE

[76] Inventor: Jacques Mongault, 82 rue Dutot, Paris 15EMe, France

[21] Appl. No.: 618,385

[22] Filed: Oct. 1, 1975

[30] Foreign Application Priority Data

Oct. 2, 1974  France ........................... 74.33156

[51] Int. Cl.² ............................................ B60C 27/02
[52] U.S. Cl. ..................... 152/239; 152/221; 152/231; 152/218; 152/242
[58] Field of Search ............... 152/239, 241, 219, 217, 152/221, 222, 223, 225 R, 213 R, 232, 233

[56] References Cited

U.S. PATENT DOCUMENTS

| 1,346,226 | 7/1920 | Mager | 152/222 |
|---|---|---|---|
| 1,854,616 | 4/1932 | Lowe | 152/221 |
| 2,462,472 | 2/1949 | Cuillierrier | 152/241 |
| 2,705,520 | 4/1955 | Erving | 152/219 |
| 2,743,755 | 5/1956 | Fullerton | 152/219 |
| 2,931,413 | 4/1960 | Randall | 152/219 |
| 3,028,901 | 4/1962 | Batori | 152/239 |
| 3,752,204 | 8/1973 | Ouellette | 152/241 |
| 3,762,456 | 10/1973 | Clouston | 152/241 |
| 3,817,307 | 6/1974 | Detwiler | 152/239 |

FOREIGN PATENT DOCUMENTS

| 504,882 | 12/1954 | Italy | 152/219 |
|---|---|---|---|
| 352,918 | 4/1961 | Switzerland | 152/239 |

*Primary Examiner*—Drayton E. Hoffman
*Attorney, Agent, or Firm*—Darby & Darby

[57] ABSTRACT

A non-skid device for vehicle wheels having a pair of cables, one for each side of the wheel, with positioning nipples fixed at intermediate points of the cables and stop nipples at each end of each cable. A plurality of elastic anti-skid members are provided having a safety hook on each end. The hook at each end of each anti-skid member is attached to one of the cables at a point adjacent a nipple and a hook of one of the members connects the end of a cable together at a stop member.

10 Claims, 8 Drawing Figures

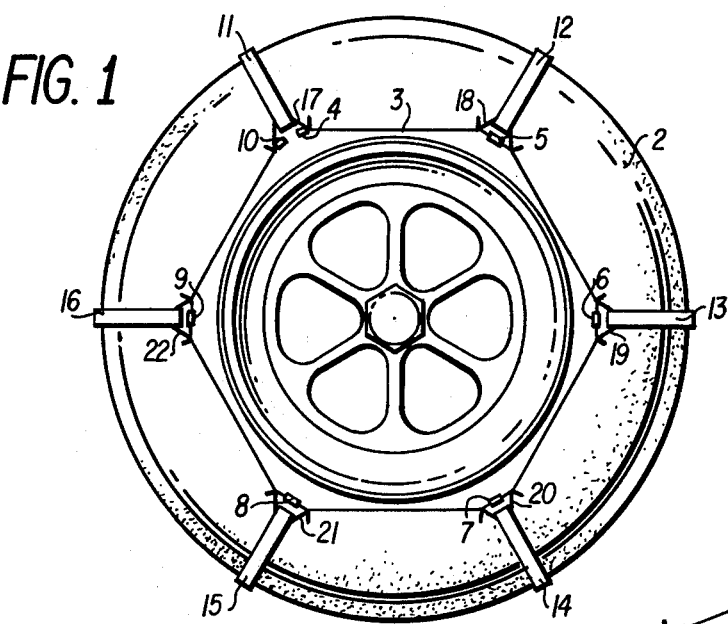
FIG. 1
FIG. 2
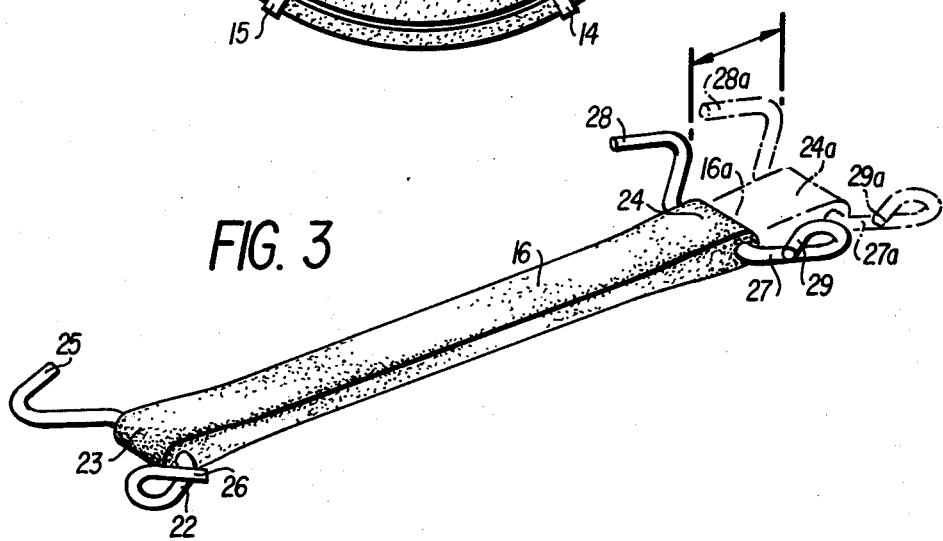
FIG. 3
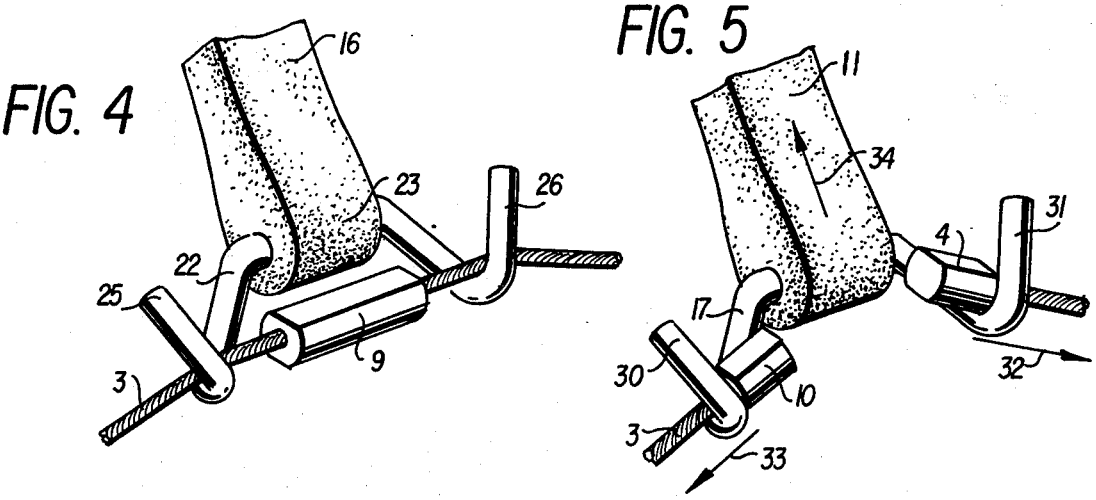
FIG. 4
FIG. 5

ANTI-SKID DEVICE

The invention relates to auxiliary equipment for vehicle wheels and in particular to a device which can be adapted to most, if not all, known types of wheels, making it possible to drive under the best conditions regardless of the weather and the state of the roads encountered.

In French patent application No. 7,225,936, filed on July 19, 1972, a means of attachment of non-skid elements is shown which is determined essentially as a function of the vehicle wheels to be equipped. In general, vehicle wheels are formed by a disc combined with a hub. However, there are many types of wheels which differ from one another in their discs as well as in their rims.

In the case of a wheel made of light alloy, the disc is formed by a sort of star having a larger or smaller number of bands. Likewise, in the case of a spoked wheel, the spokes, attached to the center of the wheel, at the hub, serve as the disc of the wheel.

In the majority of wheels used in the automobile industry, the disc is made of stamped sheet metal. It can have openings of various dimensions and shapes, designed to improve the cooling of the brake device, or there can be none at all, as is often the case in low-powered vehicles. In addition, the "deport" (the distance from the roadway to the face making contact on the hub) varies from one model of wheel to another.

The rim of a wheel made of light alloy or of polyester resin, is molded, while the rim of an ordinary wheel is made of a metal sheet that is rolled and then welded. Although the general profile of the rim is well defined, from one edge of contact of the tire bead to the other, by the very nature of the rim, there is still no standardization to this date relating to the ends of these various profiles, which generally constitute a more or less pronounced flange that is commonly designed to receive wheel balancing weights. This is true to such an extent that the shapes and dimensions of the flanges vary, not only from one type of rim to the next, but also, for a given type of rim, from one manufacturer to the next.

When it is a matter of equipping a type of wheel whose disc has adequate openings with a non-skid device, the proper solution for this type of wheel must take into account the fact that the non-skid elements and their means of attachment must act to belt both the rim and the tire, in order to transmit the maximum torque without the risk that the non-skid elements will regroup or shift position. However, very often this solution is barred by the lack of space available between the inner diameter of the rim and the braking, steering or suspension members belonging to the vehicle on which the wheel is mounted.

Likewise, when the type of wheel to be equipped has, in principle, adequate wheel rims, so that the non-skid elements may be fastened thereon, we are often limited by the quality of the manufacture, inasmuch as the observation of tolerances defining the height of the flanges of the hub in question. This height depends on the precision and the care with which the strip of sheet metal, from which the rim is fashioned is cut and then rolled up. Up to now, these tolerances have been given little importance. As a matter of fact, if the flanges of the rims are inadequate, the non-skid elements run the risk of becoming detached as soon as the tire undergoes severe crushing, such as when a bad road is entered, when driving into holes, running over rises, or when the wheel scrapes a vertical wall, as well as when the sides of the tire are caught in a rut. All of the foregoing driving conditions compromise to a great extent the effectiveness and the security of a non-skid device. In addition, in a non-skid device in which the ends of the non-skid elements are mounted in extension and are simply pressing on the inside of the flanges of the rim, it cannot be made certain that these elements, which are independent of one another, will not come together when it becomes necessary to transmit a substantial torque.

Therefore, although the means of attachment provided in the aforesaid French patent application No. 7,225,936 make it possible in theory to mount the non-skid device on the various types of existing wheels, it proves in practice that, with ever increasing frequency, cases are encountered in which the application of the device is considerably limited and which have lessened the effect on performance. It is evident that, insofar as the device of the above patent application is concerned, the best solution would be in being able to have all rims with identical and perforated flanges, in order to be able to attach the ends of the non-skid elements. However, it does not seem very probably at the present time to impose such a type of rim on the manufacturers and builders of automobiles.

Aside from analogous non-skid devices, whose means of attachment exhibit the same restrictions in practice described above relating to their adaptation to the various known types of wheels, there are other devices whose means of attachment are entirely independent of the type of wheel to be equipped. These devices have, as one outstanding fault, the fact that the attachment means are integral with the non-skid elements. This makes practically every model of the device adaptable to only one dimension of tire. Further, these devices also include means of adjustment for obtaining the desired tension on the means of attachment which complicate the operations of mounting and dismounting, in addition to increasing the cost of the non-skid device.

The present invention relates to improvements in the removable non-skid and supplementary device for automobile wheels described in the aforesaid French patent application 7,225,936 while retaining its main objects. Accordingly, the present invention is directed to a non-skid device having means of attachment which make it possible to mount it on any type of wheel, whatever the arrangements of the mechanical members of the vehicle on which the wheel is mounted.

Therefore, one of the objects of the invention is to provide a non-skid device having means of attachment which allow the transmission to the ground of a substantial torque without having the non-skid elements tending to regroup.

Another of the objects of the invention is to provide a non-skid device having means of attachment making it possible to pass over obstacles which cause the tire to undergo successive and highly localized crushing without having the non-skid elements be able to become unfastened.

An additional object of the invention is to provide a non-skid device having means of attachment which make it possible to pass through ruts, without the risk of having the non-skid elements become unfastened.

Another of the objects of the invention is to provide a non-skid device having means of attachment which prevent the constituent elements from being projected if one of them should happen to break.

A further one of the objects of the invention is to provide a non-skid device having means of attachment which facilitate the mounting and dismounting of the device.

Yet another one of the objects of the invention is to provide a non-skid device covering the full range of tire dimensions with very few models.

Another of the objects of the invention is to provide a non-skid device having standard, identical constituent elements common to several ranges.

A further one of the objects of the invention is to provide a non-skid device making possible, by changing one of the constituent elements, another range of sizes.

An additional one of the objects of the invention is to provide a non-skid device which can adapt to the difficulties encountered according to their kind of magnitude.

Another of the objects of the invention is to provide a non-skid device of small bulk, inalterable and requiring no maintenance.

A further one of the objects of the invention is to provide a non-skid device of very low cost price and providing a long useful life.

Therefore, the device according to the invention comprises two independent and identical attachment cables, on which are fixed from one end to the other at regular intervals, positioning nipples as well as several non-skid straps. The straps are removable and interchangeable and are formed by an extensible linear element which has, at each end, a safety hook that connects the cables transversely together at the level of their positioning nipples. One of these non-skid belts provides, among other things, by means of its safety hooks, the connection or buckling between the ends of each of the attachment cables and is placed under tension by the fastening of the last non-skid strap to them at the moment of final installation step of the device on the wheel to be equipped.

The device according to the invention makes it possible due to its design to equip any type of wheel inasmuch as the various constituent elements are assembled together and around the tire so that the non-skid straps cannot regoup together or become unfastened accidentally since they are put in place on the positioning nipples with the aid of their safety hooks. The non-skid device of the invention can, with few models, be used for all of the tire dimensions or at least can easily be adapted thereto owing to the fact that the assembly of these various constituent elements is embodied only at the moment of the mounting of the device on the wheel to be equipped. The dimensions of the non-skid device depend, in the case of the cables, only on the diameter of the wheel, and in the case of the straps, which are, moreover, extensible, only on the width of the tire. Likewise, the fact that the device as a whole, when installed, is held under tension by the non-skid straps themselves, greatly facilitates the operations of mounting and dismounting while making for a substantial gain in the manufacturing cost of such devices.

Other characteristics and advantages of the invention will appear more clearly on reading the description which follows, which presents, in explanatory but non-limiting fashion, several forms of embodiment according to the invention, illustrated by the attached drawings, in which:

FIG. 1 shows a wheel equipped with the non-skid device according to the invention.

FIG. 2 is a plan view of one of the two attachment cables of the device.

FIG. 3 is a perspective view of one of the removable and extensible non-skid straps of the device.

FIG. 4 is a detailed view showing a safety hook attached to one of the attachment cables, at the level of the positioning nipple.

FIG. 5 is a detailed view showing the connection between the two ends of an attachment cable, by means of one of the safety hooks.

Figure 6:
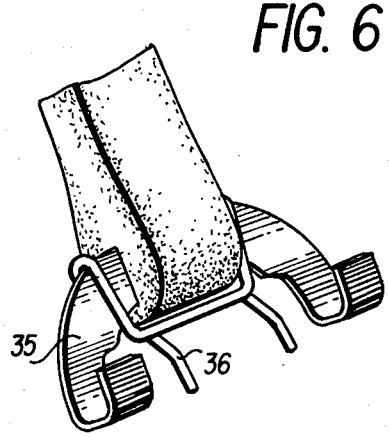
FIG. 6 is a detailed view showing another type of safety hook.

Referring to the first five figures, and more particularly to FIG. 1, there is seen a non-skid device according to the invention mounted on wheel 1, equipped with a tire 2. The device is formed by a plurality of identical non-skid straps 11, 12, 13, 14, 15, 16, stretched and fastened to an attachment cable 3, by means of the respective hooks 17, 18, 19, 20, 21, 22, at the level of respective positioning nipples 4, 5, 6, 7, 8, 9, 10. The non-skid strap 11 also has in the present case, a connection between end nipples 4 and 10 of cable 3 by means of its safety hook 17. If the opposite side of the tire were represented in FIG. 1, a symmetric design would appear since the device according to the invention comprises two identical cables 3, one situated on either side of the tread of the tire, connected transversely together by several removable and interchangeable non-skid straps.

FIG. 2 shows one of the two attachment cables 3 of the non-skid device. From this figure it will be better understood that by its design the device can be used for any type of wheel, and can adapt itself easily to a plurality of dimensions of tires. The attachment cable 3 is preferably formed by a simple cable of stainless steel, which can be solid or stranded wire, on which the positioning nipples 4, 5, 6, 7, 8, 9, 10 are fixed at regular intervals from one end to the other. The length of cable 3 depends, for a given number of straps, only on the diameter of the wheel on which the device is to be mounted, and independently of the width of the tire with which the wheel will be provided.

In this example, the positioning nipples 5, 6, 7, 8, 9, aside from the end ones 4 and 10, which differ from the others only by their length which is reduced by half, can be a steel sleeve or ferrule, stamped or crimped or otherwise fastened directly on the cable at intervals corresponding to the respective positions which the straps are to have while in use. The number of positioning nipples depends on the number of non-skid straps which are to be fastened to the attachment cables.

FIG. 3 shows one of the removable non-skid straps 16. The strap is of rubber or other suitable elastic material and FIG. 3 shows in dotted lines the extension assumed by each of them, once the operation of mounting of the non-skid device on the wheel to be equipped is terminated. The non-skid strap 16 is similar to the linear element described in French patent application No. 7,225,936, but exhibits a profile obtained by extrusion or drawing. The ends 23 and 24 of the strap are provided with identical safety hooks 22 and 27 whose respective terminations 25, 26, 28, 29 are bent so that they cannot come unhooked accidentally when they are fastened to the attachment cables of the non-skid device.

As seen in FIG. 4, one of the features of these safety hooks makes it possible to limit, to about 20%, the stretch illustrated by the end 24a of strap 16a provided with its safety hook 27a with its terminations 28a and 29a. Even if the strap is abruptly stretched, either by a localized crushing of the tire, or by rubbing of the sides of the tire along a vertical wall, the safety hooks holding it to the attachment cables cannot become undone by themselves.

It is seen in the detailed FIG. 4 that the end 23 of strap 16 fixed to cable 3 by means of its hook 22, straddles the positioning nipple 9. Each of the terminations 25 and 26 is in the shape of at least a part of a spiral. Each of the terminations of the safety hook 22 exhibits an open profile along two very distinct non-parallel planes, proper to each of them, while together they exhibit a closed profile in the plane perpendicular to the one proper to the cable once the device is put in place on the wheel to be equipped.

In the preferred embodiment, safety hook 22 is formed from stainless steel wire, which is round in order not to injure either the end 23 of strap or the attachment cable 3. In addition, the outer diameter of the positioning nipple 9 is about three times that of the cable, in order to exhibit, with respect to terminations 25 and 26 of hook 22, faces perpendicular to the cable 3 which are adequate for good positioning of the strap end 16a, and above all to prevent it from slipping over the cable when there is a substantial torque to be transmitted.

FIG. 5 shows how the end nipples 4 and 10 of cable 3 are buckled inside the terminations 30 and 31 of safety hook 17 of non-skid strap 11. Arrows 32, 33, 34 show the direction of the forces applied to this connection, once the mounting of the non-skid device is terminated, and due in particular to the extension of all the non-skid straps provided on the device at the moment when the last of them is fastened on the attachment cables.

It should be understood that only a few lengths of extensible non-skid straps are all that is needed in order to cover all widths of tires.

In practice, and for passenger cars, the present device can cover, with the aid of only two dimensions (lengths) of strap, all tire widths ranging from 125 to 185 inclusive. Likewise, insofar as the lengths of the attachment cables are concerned, four dimensions are sufficient in order to be able to equip wheels whose diameters are 10, 12, 13, 14 and 15 inches.

FIG. 6 shows another embodiment of a hook 35 with a safety tongue 36.

Figure 7:
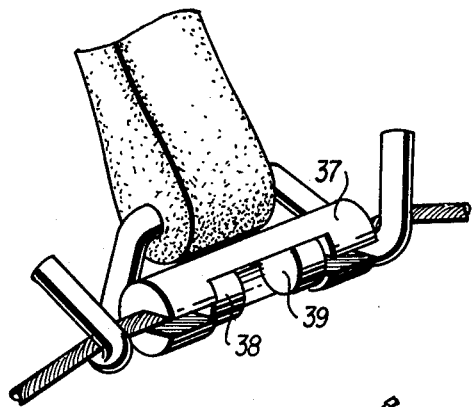
FIG. 7 is detailed view showing another type of connection between the ends of an attachment cable.

FIG. 7 shows a safety belt 37 for buckling the end nipples 38 and 39.

Figure 8:
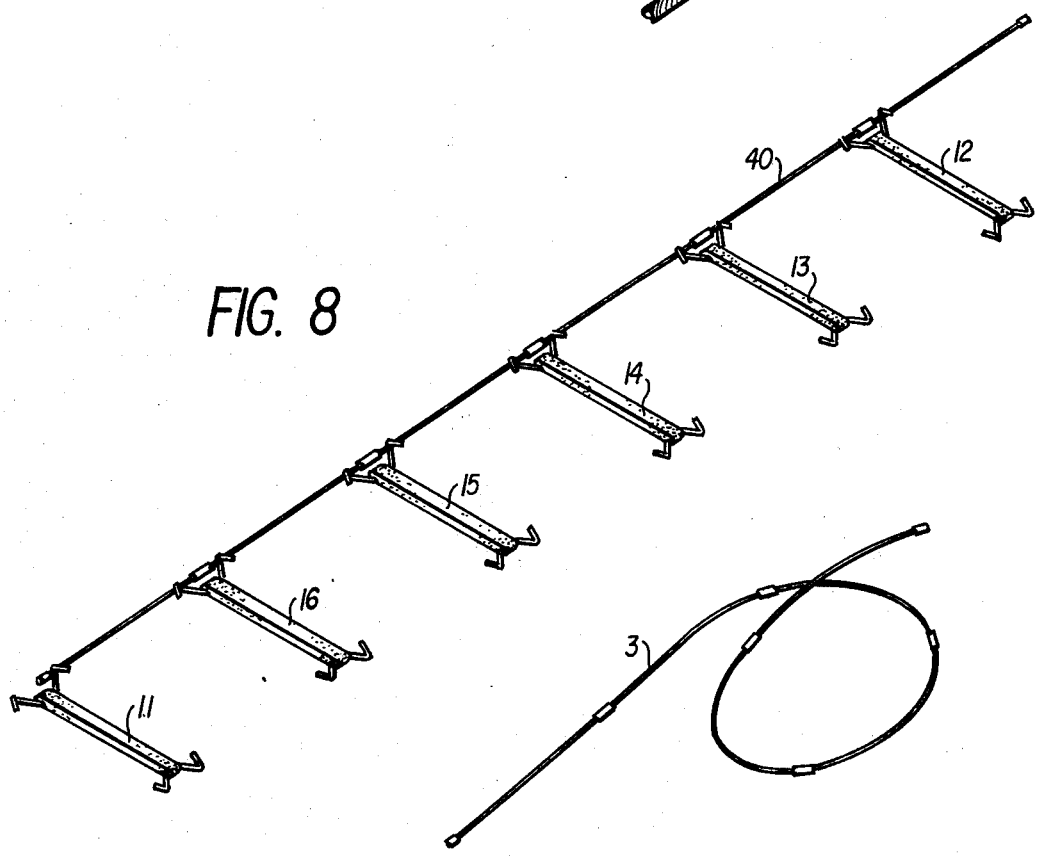
FIG. 8 is a view showing the non-skid device preassembled before mounting on the wheel to be equipped.

FIG. 8 shows a complete set of components for the non-skid device needed to equip a vehicle wheel. In order to facilitate the mounting of the assembled device, the non-skid straps 11, 12, 13, 14, 15 and 16 are preassembled on the attachment cable 40 which will be located on the inside of the wheel. The straps 14 and 15 are disposed on each side of the surface of the tire which is in contact with the ground. The ends 4, 10 of the inner cable 40 are buckled with the safety hook of strap 11 and the ends of the outer cable 3 are fastened to the remaining available safety hook on strap 11. Finally, and in the order indicated, there is successively fastened to attachment cable 3 the respective safety hooks of the non-skid straps 14, 15, 13, 16 and terminating with strap 12 whose final fastening will place the assembled device under tension. While a preferred order of fastening the straps has been indicated, it should be understood that the order of fastening can be varied.

It is clear from the foregoing that a new non-skid device for vehicle wheels equipped with tires has been provided.

It should be noted in particular that this device is formed by extremely simple, unalterable elements, requiring practically no maintenance, is most easy to use, while offering good performances that makes it possible to travel under optimal conditions, whatever the weather, and the state of the roads encountered.

The invention is in no way limited to the methods of embodiment described and illustrated, which have been given only by way of example.

On the contrary, the invention comprises all means constituting technical equivalents of those described and illustrated, considered separately or in combination, and applied within the scope of the following claims.

What is claimed is:

1. Anti-skid device for a vehicle wheel comprising:
    a plurality of removable and extensible anti-skid straps to be disposed across the road-contacting portion of said wheel,
    first and second independent attachment cables, one for each side of the wheel to be equipped,
    a plurality of positioning nipples fixed at spaced intervals on the intermediate portion of each of said cables,
    stop nipples fastened on the ends of one of said cables,
    a safety hook fastened to each of the ends of each of said anti-skid straps, each safety hook of a strap adapted to be connected to a corresponding cable at a positioning nipple thereon, the safety hook at the end of one of said straps adapted to connect the ends of said one cable together by engaging said stop nipples, said safety hook for said end connection also providing mechanical tension for said cable when mounted on said wheel; and
    means for connecting the ends of said second cable.

2. A device as in claim 1 wherein the terminations of said safety hooks of said non-skid straps are folded over.

3. A device as in claim 2 wherein the folded over terminations of said safety hooks are in the shape of a spiral.

4. A device as in claim 1 wherein said safety hooks are adapted to straddle the positioning nipples.

5. A device as in claim 1 wherein said stop nipples fastened on the ends of at least said one cable are identical to the intermediate positioning nipples.

6. A device as in claim 1 wherein said positioning nipples comprise ferrules, crimped onto the attachment cable.

7. A device according to claim 1 wherein the outer diameter of a positioning nipple is about three times that of the cable on which it is fixed, the ends of the nipple formed to present two faces perpendicular to the cable.

8. A device according to claim 1 wherein the safety hooks comprise flat, U-shaped hooks whose ends are curved, and a removable tab to provide a snap-hook closure.

9. A device as in claim 1 further comprising safety locking apparatus forming the connection between the ends of the attachment cables.

10. Anti-skid device adapted for mounting on a vehicle wheel comprising:
    first and second cables, one for each side of the wheel to which the device is to be attached, a plurality of positioning means fixedly fastened at spaced intermediate positions on each of said cables;
attachment means at the ends of at least one of said cables;
a plurality of anti-skid members for positioning across the road-contacting portion of said wheel;
connecting means at the ends of each of said anti-skid members for connecting each of said anti-skid members to a selected one of said corresponding means, the connecting means at the end of one of said anti-skid members is adapted to connect the ends of said one cable by engaging the attachment means at the ends of said one cable; and
means for attaching the ends of said other cable.